Nov. 1, 1927.  
F. L. SCOTT ET AL  
1,647,753  
DRILL CUTTER  
Filed April 15, 1926
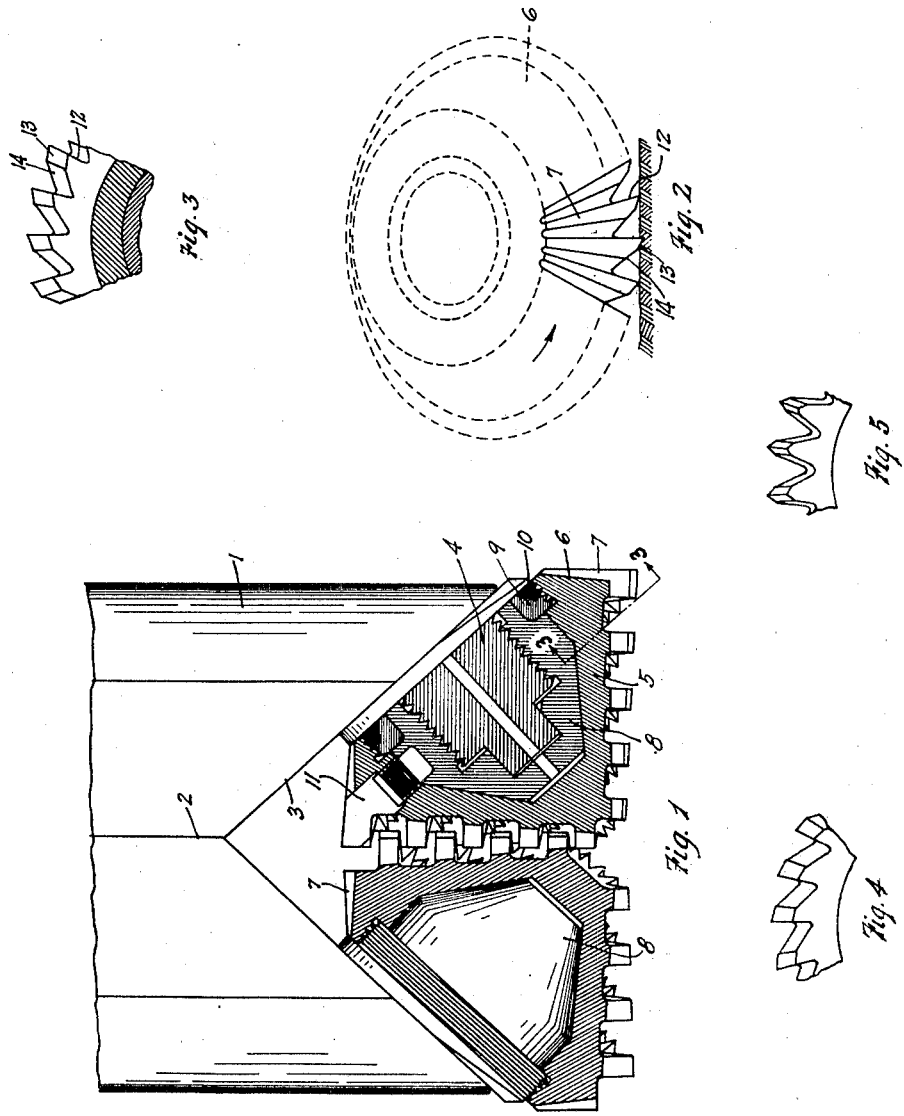
Louis H. Weblensick,  
Floyd L. Scott,  
Inventors
By Jesse R. Stone  
Attorney Patented Nov. 1, 1927.

1,647,753

UNITED STATES PATENT OFFICE.

FLOYD L. SCOTT AND LOUIS H. WELLENSIEK, OF HOUSTON, TEXAS, ASSIGNORS TO HUGHES TOOL COMPANY, OF HOUSTON, TEXAS, A CORPORATION OF TEXAS.

DRILL CUTTER.

Application filed April 15, 1926. Serial No. 102,210.

Our invention relates to cutters for earth boring drills such as are employed in drilling wells for oil, water, gas and the like. The invention is particularly applicable to the conical shaped cutters commonly employed on rock drills; where the cutters have approximately a true rolling motion upon the bottom of the hole. Where two such cutters are mounted for operation close together so that the cutter teeth on adjacent sides interfit to get a self cleaning action, the traction of the cutters upon the bottom of the hole is at times not sufficient to cause the cutters to rotate effectively, particularly in the softer formations.

It is an object of our invention to provide teeth so formed upon a cutter having a conical surface that they will interfit on adjacent cutters, and thus be cleared of material adhering thereto; and which are also shaped comparatively long and narrow so as to assist in the rotation of the cutter.

It is also desired to space the cutters uniformly apart along the cutter so that the interfitting teeth will have wide and deep clearance, and be thus enabled to rotate without undue sticking together of the cones.

In the use of the conical shaped cutter, it is ordinarily mounted upon a supporting shaft or pin so that the cutting surface will, if extended, come to an apex at a point near the central axis of rotation of the drill. The cutter, in rotating, will therefore have an approximately true rolling motion, due to the fact that each portion of the cutting area will roll in a circle of the proper radius.

In the drawing, the cutters embodying the invention are shown thus mounted. In Fig. 1, the said cutters are shown in central vertical section, the bushing of one cutter being in elevation. Fig. 2 is a perspective view, partly diagrammatic, of the base of the cutting cone assembled ready to be attached to the head of the drill. Fig. 3 is a broken section on the line 3—3 of Fig. 1. Figs. 4 and 5 show modified forms of cutting teeth which may be used. Like numerals of reference are employed to designate like parts in all the views.

The drill to which our invention is applied is a common one, well known in the art. There is a head 1, the lower end of whch is shown. Said head is ordinarily split along a central plane 2, and the lower end of the head has a transverse slot 3, of inverted V-shape therein. The pins 4, upon which the cutters are mounted, are inclined downwardly and inwardly from the sides of slot 3 toward the central axis of the head.

The cutters 5 are conical on their outer cutting faces, the base of the cutters being beveled outwardly at 6, and toothed at 7 to cut the side wall of the hole. Each cutter is hollowed out on the interior to fit over the end of a bushing 8, the forward end of which is frusto-conical in shape. The bushing 8 is cylindrical toward its base and is threaded on its interior to attach to the cutter shaft 4. A locking ring 9, screwed within the base of the cutter and over-lying the bushing acts to hold the cutter on said bushing. A strip of metal 10 may be welded along the margin of the locking ring to hold it in position. An opening 11 extending radially through the cutter and into the bushing serves to allow the insertion of a pin or wrench by means of which the cutter and bushing can be screwed upon the supporting shaft 4 after the cutter and bushing have been assembled and locked together.

The part of the construction so far described is believed to be old in the art. Our invention lies in forming upon such a drill cutter as is here shown, a form of cutting tooth adapted to assist in the rotation of the cutter, and also most effectively engage the material being cut. Teeth have previously been formed of approximately pyramidal shape on cutters of this character.

We have changed the form of the teeth and have also spaced them apart to allow greater clearance. The cutter in rolling, turns on its axis as indicated by the arrow in Fig. 2, and the side first contacting with the bottom is designated as the forward side. The said forward side 12 is shown in Figs. 1 to 3 inclusive as extending from the body of the cutter in a direction approximately radial to the center of the cone, it being understood that the lateral inclination of the rows of teeth is toward the apex of the cone to bring the teeth vertically downward on the bottom of the hole as shown in Fig. 1. The rearward side of each tooth is inclined inwardly from the forward face at an acute angle for a short distance and then at a more acute angle providing two inclined areas 13 and 14 the teeth thus forming a series of chisels, which because of the approximately true rolling action of the cutters, are presented in a direction approximately downward upon the bottom of the hole. The action of each tooth is, therefore, the same as would occur if a chisel with the cutting edge here shown were used. The tooth tends to be urged forwardly by the inclined rear face of the cutting tooth, thus not only resulting in an efficient cutting stroke, but also assisting in the turning of the cutter. A tooth thus formed upon a conical cutter is found to be nearly twice as effective as the usual form of bit, the cutting teeth of which are comparatively thick at the base and not spaced apart as here shown.

It is also to be noted that the teeth are arranged in circumferential rows on the cutter, the adjacent sides of the rows being parallel. The rows are spaced apart about twice the width of each tooth thus allowing ample clearance, and forming a narrow tooth, not quickly dulled, and effective in penetrating the formation.

In Fig. 4 a tooth similar to that shown in Figs. 1 to 3 is illustrated. It has the opposite inclination of the cutting edge, however. Such a tooth has the same penetrating effect as the other form except that it does not materially assist in the rotation of the cutter. In the harder formations where the cutters do not tend to ball up with material, this cutter has the advantage of cutting chips of rock from the bottom of the hole, which chips are moved forwardly and carried away effectively by the flushing fluid. In hard digging it serves its purpose fully as effectively as the first described form of tooth.

In Fig. 5, the tooth is long and thin as in the other forms the forward and rearward sides being evenly and symmetrically beveled close to the cutting point. The penetrating effect of this tooth is good and it will work effectively in most hard formations. It is to be noted that, by cutting the teeth in circumferential rows spaced widely apart, a narrow, penetrating tooth may be formed. The further cutting of the teeth deeply in the rows provides a series of long sharp chisels which do not dull for long periods. Such a cutter will cut effectively for a longer time, and will do much faster work when thus operating.

The advantages of the construction of the tooth here shown result from the form of cutter and its mounting which gives to the surface of each cutter a true rolling action. This delivers to the cutting teeth a downward chisel stroke instead of a scraping action, and thus causes a strong traction effect of the long sharp teeth upon the bottom of the hole, acting to assure rotation of the cutter.

What we claim as new is:

1. In a well drill, approximately conical shaped cutters mounted to have an approximately true rolling action upon the bottom of the hole, cutting teeth on said cutters formed in circumferential rows around said cutters, said rows being spaced apart to allow the teeth on adjacent cutters to interfit, one face of each tooth being approximately radial, the other face being beveled from the straight face to effect an inclination toward said radial face tending to give a chipping action on the formation, in the manner described.

2. In a well drill, approximately conical cutters mounted with the apices of said cutters adjacent the axis of rotation of the drill, cutting teeth on said cutters arranged in circumferential rows and inclined toward the apex of the cutter so as to extend vertically downward when in contact with the bottom of the hole, said rows of teeth having their adjacent sides parallel, the rows being adapted to interfit in the manner described, to provide wide clearance, said teeth being cut deeply in the rows to provide long narrow penetrating chisels.

3. In a rotary well drill having cutters with their cutting areas converging toward the central axis of the drill and mounted to contact with the bottom of the hole with an approximately true rolling motion, cutting teeth formed on said cutters in circumferential rows, the rows of teeth on each cutter being offset relative to the teeth on the adjacent cutter and adapted to interfit therewith, the opposite sides of each row of teeth being deeply cut and spaced apart to allow clearance between adjacent interfitting teeth and thus produce long narrow penetrating chisels, the ends of said teeth being formed into cutting edges of the full width of said teeth.

4. In a rotary well drill having cutters with their cutting areas converging toward the central axis of the drill and mounted to contact with the bottom of the hole with an approximately true rolling motion the combination of cutting teeth formed on said cutters in rows extending around the conical surface of the cutter, the teeth on one cutter being offset relative to those on the adjacent cutter, the opposite sides of each row of teeth being deeply cut and spaced apart to allow clearance, and to produce long narrow penetrating chisels, the cutting edges of said teeth extending the full width thereof.

5. In a well drill, approximately conical cutters mounted thereon with the apices of said cutters adjacent the axis of rotation of the drill, cutting teeth on each of said cutters arranged in circumferential rows and inclined toward the apex of the cutter so as to extend vertically downward when in contact with the bottom of the hole, said rows being spaced apart to provide wide clearance, and the adjacent sides of said rows being approximately parallel, the rows being cut deeply to provide long narrow penetrating chisels adapted to pierce deeply into the formation.

In testimony whereof, we hereunto affix our signatures this the 12th day of April, A. D. 1926.

LOUIS H. WELLENSIEK.
FLOYD L. SCOTT.